Patented Oct. 22, 1935

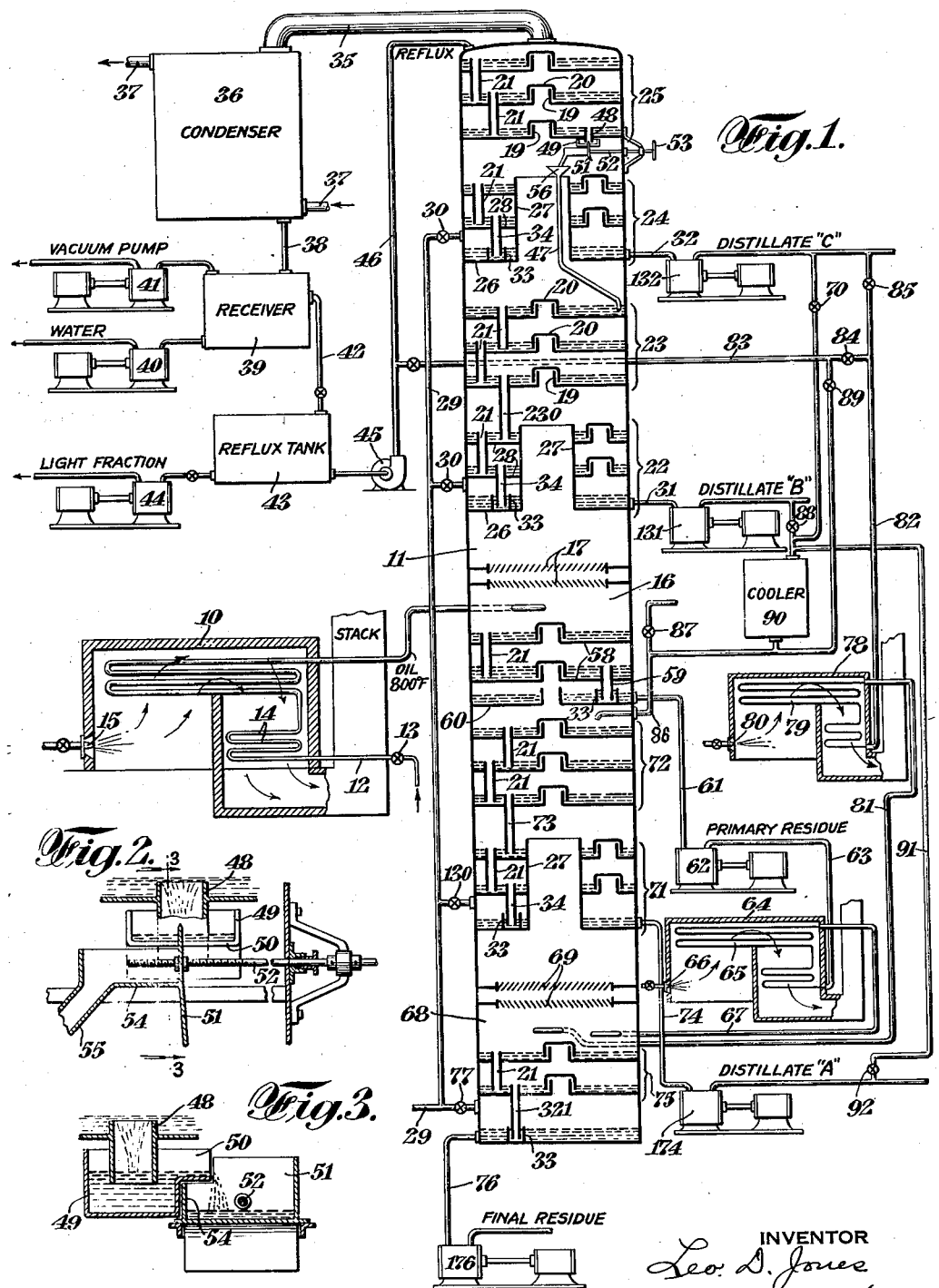

2,018,309

UNITED STATES PATENT OFFICE 2,018,309

DISTILLATION OF MINERAL OIL

Leo D. Jones, Philadelphia, Pa., assignor to The Sharples Specialty Company, Philadelphia, Pa., a corporation of Delaware Application March 14, 1932, Serial No. 598,580

33 Claims. (Cl. 196—94)

This invention relates to the fractionation by distillation of all mineral oils including crude petroleum from various sources and residues and distillates thereof.

An important feature of this invention is that high-boiling constituents of the oil to be distilled are obtained as distillates or as constituents of distillates containing relatively lower-boiling constituents, with a minimum of cracking of the oil fractionated. Other important features of this invention are that high-boiling lubricating-oil constituents are recovered in a condition in which they are well suited to the production of lubricating oil from asphalt-containing residues whereas by usual distillation processes such constituents are either not recovered at all or are not recovered economically in that form; and that the heating applied in effecting the distillation is economically employed with a minimum of waste and with a minimum of cracking or degradation of the oil distilled.

In the continuous fractional distillation of oil, particularly in the production, in accordance with the process described in my copending application Serial No. 370,852 filed June 14, 1929, of fractions of wax-containing oil which contain wax in a form well suited to the removal thereof, the oil is subjected to vaporizing heating by being passed through a pipe-still in which its temperature is raised to a temperature that will not effect substantial cracking in such a still, e. g., a temperature in the neighborhood of 800° F. Then the oil and such oil vapors as may have formed in the pipe-still are introduced into a rectifying column such as a bubble tower, at an intermediate level thereof and further vaporization of oil occurs as a result of reduction of pressure on the oil and contact of the oil with steam within the tower. The expression "vaporizing heating" is intended herein to refer to such heating as will cause vaporization of some of the oil after it has been introduced into the tower although some of the oil may vaporize while it is in the pipe-still. A flow of reflux liquid, e. g., condensed exit vapor, is maintained into the top of the tower and a regulated flow of reflux liquid is maintained within the tower from the top downward. A flow of steam is maintained at the bottom of the tower and may be maintained at points above the bottom. A fraction consisting of an asphalt-containing residue is drained from the bottom of the tower, a fraction containing wax which precipitates upon cooling in a plastic or amorphous form is withdrawn from a level of the tower near the bottom thereof, a fraction containing wax which precipitates upon cooling in crystalline form is withdrawn from a higher level of the tower, and successively lower-boiling fractions may be withdrawn from successively higher levels of the tower while lighter constituents such as naphtha pass from the top of the tower in the form of vapor and are condensed. If sub-atmospheric pressure is maintained within the tower, lighter constituents cannot be condensed under such pressure and the oil treated must be preliminarily freed thereof and the exit vapors under such conditions will be kerosene or gas oil.

While the foregoing procedure, when carefully controlled, is capable of being successfully employed for the production of fractions which are each well freed of the constituents occurring in the other fractions, features of this invention render that process more generally applicable and more readily practicable and avoids difficulties and losses which may be encountered in the foregoing procedure, particularly if that procedure is not followed with great care.

In the practice of continuous distillation of the type above referred to, there is a sudden vaporization within the tower of a part of the oil which has been subjected to vaporizing heating and then introduced into the tower. As a result of such vaporization and of loss of heat by radiation the temperature in that zone of the tower, within which vaporization occurs, is considerably lower (e. g. 715° F.) than the temperature to which the oil was heated in the vaporizing heating (e. g. 800° F.). There is, therefore, available only such a reduced temperature and limited quantity of heat for the purpose of effecting evaporation of the most viscous lubricating oil constituents from the asphaltic residue; and that temperature and heat quantity is not only insufficient to vaporize completely the most viscous oil from the residue but if reflux is flowed downward into the vaporizing zone, as for the purpose of separating asphalt particles or color impairing constituents from the highest boiling distillate, the effective temperature will be further reduced and a quantity of viscous oil additional to that which was not vaporized will be thrown down into the asphaltic residue and the highest-boiling distillate will contain even less of the most viscous lubricating oil constituents. Such loss of viscous oil into the asphaltic residue constitutes a substantial loss.

The above mentioned deficiency of heat and of temperature within the tower prevents the vaporization of the highest-boiling lubricating oil constituents and prevents the recovering of those constituents to a maximum degree from the asphalt-containing residue, and effects a loss of valuable lubricating oil constituents.

The above-mentioned deficiency of heat and temperature cannot be compensated for by increasing the ratio of the quantity of steam passed through the tower to the quantity of oil introduced into the tower. Under certain conditions the contacting of a body of oil with a greater amount of steam will vaporize more of the oil than will contacting the same body of oil at the same temperature with a lesser amount of steam, but various factors render commercially impracticable the increasing of the above-mentioned ratio in the vaporizing zone of the tower. The temperature in the vaporizing zone is far above the temperature at which steam will condense at the pressure existing therein, and the latent heat of vaporization of the steam is not available for heating and vaporizing the oil and any rise in temperature by introduction with steam, if any, is due only to the passage of heat from the steam to the oil by equalization of the temperature of the steam and the oil and oil vapor; and only a relatively small amount of heat can be brought into the vaporizing zone in this way because the steam cannot be introduced at a temperature so high that the oil will be injured thereby, and the ratio of the quantity of steam passed through the tower to the quantity of oil introduced thereto is limited. The limitation upon this ratio is due to the fact that the rate at which vapors (oil and steam) can be passed through a tower is limited to a rate at which they are effectively acted upon, too high a rate causing impaired or ineffective operation of the tower and causing asphalt to be carried, as by mechanical entrainment of particles thereof in the vapors, into the distillate withdrawn immediately above the vaporizing zone. From this it appears that in order to effect any substantial increase in the evaporation of heavy constituents by the use of steam a substantial increase in the ratio of steam to oil would be necessary, and that an increase in that ratio necessitates a reduction in the rate at which oil is fed to the tower and treated therein, in order that the treatment will be effective. But, in common operation the volume of steam in the tower is greater than the volume of oil vapor therein and a reduction in the rate of oil supply to correspond to any effective increase in the rate of steam supply obviously so reduces the capacity of a tower to treat oil effectively that a commercially impracticable situation occurs. The fact is that the low weight of a unit volume of steam compared to the weight of the unit volume of oil renders steam unsuited for carrying heat to oil in apparatus which necessarily has limited dimensions but in which effective treatment of the oil necessitates a limited rate of flow of vapors. Thus, it appears that it is impracticable to compensate for the above-mentioned deficiency of heat and temperature by increasing either the quantity or temperature, or both, of the steam supplied to the tower. Moreover, it is impossible to make up the deficiency of heat and temperature within the tower by heating the oil, in the vaporizing heating thereof, to a higher temperature prior to introducing it into the tower, because such higher temperature would cause the oil to decompose to an undesirable extent with consequent loss of viscous constituents and decrease of amorphousness of the wax contained in the most viscous distillate. Cracking degrades the oil, converting its constituents respectively into substances having lower-boiling points and lower flash points.

A feature of this invention is that heat is supplied to the oil to be fractionated, in such quantity and by being supplied to such bodies of oil existing in the fractionating tower, that without harmful cracking of the oil a sharp cut may be made between lubricating-oil constituents of the oil treated and the final asphaltic residue thereof and a maximum quantity of lubricating-oil constituents may be carried into the distillate while a minimum quantity of lubricating-oil constituents will pass out of the rectifying operation with the asphaltic residue. A further feature of this invention is that such constituents of the oil to be treated as do not vaporize within the column as a result of the vaporizing heating of the oil prior to its introduction into the column, and such oil as may be condensed into those unvaporized constituents by reason of radiation or reflux within the column, all of which is referred to herein as the primary residue, are supplied with additional heat other than that contained in the steam introduced into the bottom of the column. A further feature of this invention is that the primary residue is so supplied with additional heat, which operation is referred to herein as reheating, and subjected to contact with steam within the column, that it is thereby partially vaporized, leaving the final asphaltic residue; and desirable high-boiling constituents of the oil are recovered as a distillate or as a part of a distillate; and the lubricating oil constituents of the oil to be treated may be recovered to a maximum degree from the final asphaltic residue. A further feature of this invention is that such constituents of the oil to be treated as are so reheated in the supplying of heat to the primary residue, are not reheated more than once but are withdrawn from the column and constituents thereafter reheated in the continuous operation are constituents which have not previously been reheated.

A further feature of this invention is that steam utilized in promoting vaporization of lubricating constituents in the reheated primary residue and in promoting the recovery from the final asphaltic residue of the lubricating-oil constituents of the primary residue, is immediately used (without intermediate condensation and revaporization) for promoting the vaporization of lubricating constituents contained in the fresh oil introduced into the column after being subjected to vaporizing heating. More specifically, a further feature of this invention is that the primary residue is, preferably after being subjected to the action of steam to facilitate the vaporization of lubricating constituents thereof, withdrawn from the column and reheated and introduced into the column and there brought into contact with steam which promotes the vaporization of lubricating constituents and promotes the recovery of a maximum of lubricating oil constituents from the final asphaltic residue, while the steam and the residual vapors with which the steam is saturated are passed to the first mentioned steam-contacting operation; and a further feature is that the steam passing to the first mentioned steam-contacting operation has been so cooled after being brought into contact with the reheated primary residue that it carries no oil which will condense into the primary residue passing to the reheater, thereby preventing once-reheated oil from passing again to the reheater; and a further feature is that lubricating-oil constituents separated from the primary residue by reheating and contact with steam are separately withdrawn from the tower. A further feature of this invention is that lubricating-oil constituents separated from the primary residue by the reheating operation and by contact with steam, are withdrawn from the side of the tower below the level thereof at which is introduced fresh oil which has been subjected to vaporizing-heating. Further features of this invention are that reflux may be employed in effecting condensation within the tower of the oil separated from the final asphaltic residue by the reheating and steaming of the primary residue; and that oil so separated from the final asphaltic residue may be separately subjected to the stripping action of steam before it is removed from the column.

From a somewhat broader point of view, as in the application of this invention to other types of distillation, a feature of this invention is that one body of heated oil is subjected to the action of steam and then the resulting vapors are cooled to effect condensation of oil and the residual vapors are contacted with another body of oil which is heated to a temperature above that of the residual vapors. More specifically, steam is first contacted with a heated body of oil of relatively higher flash point and the resulting vapors are cooled and the residual vapors are then contacted with a heated body of oil of relatively lower flash point. Still more specifically, oil subjected to vaporizing-heating is introduced to a rectifying column at an intermediate level thereof and contacted with steam, and the resulting primary residue is subjected to reheating to a temperature higher than that existing at said level and introduced into the column at a lower level and subjected to the action of steam and that same steam is employed in effecting the contact with steam of the fresh oil introduced at the first-mentioned level, a special feature of the invention being that the vapors passing from the reheated oil to said first-mentioned level are of lower temperature than the temperature existing at said first-mentioned level. Accordingly, the amount of steam necessary is minimized and the steam introduced into the column is in a sense used twice, and oil once withdrawn from the column and reheated is not again carried into the oil that is being withdrawn from the column for reheating. A feature of this invention is that the liquid reflux used in connection with the reheated oil may be almost any liquid. That reflux may consist of the preferably cooled heaviest distillate withdrawn from the side of the tower above the level thereof at which the fresh oil is introduced, in which case the two distillates are combined, or that reflux may consist of a non-lubricating distillate such as gas oil, or may consist of the distillate produced by such reflux and then cooled, or may consist of a mixture of any two or more of these three distillates. Also, all or any part of the reflux may be water.

A further feature of this invention is that the foregoing features may be used in conjunction with the features of my invention disclosed in my application, Serial No. 493,037 filed November 3, 1930, to the end that a further quantity of heat may be brought into the tower which is additional to the heat carried into the tower in accordance with the foregoing description. Thus, heat may be carried into the tower through the medium of a suitable heat-carrying substance such as a metal, or oil that will not be seriously decomposed or which will be rendered more readily dewaxable by slight decomposition, such as gas oil or that distillate removed from the side of the tower which contains wax which is precipitated in hard crystalline form by chilling and which is intended to be dewaxed by filter-pressing. Such oil will carry more heat per unit volume of resulting vapors than will steam, and the vapors thereof will rise in the column and be removed at the appropriate level thereof and will not condense into the primary residue. The heat-carrying medium, after heating thereof may be introduced into the tower at any level thereof which is at or below the level at which fresh oil is introduced. It may be introduced at the level at which is introduced the reheated primary residue; and if reheating of the residue prior to such introduction to the tower is omitted the heat-carrying medium reheats the residue within the tower.

This invention is particularly useful in connection with continuous distillation in which oil is subjected to vaporizing heating and then introduced into a rectifying column, and for the purpose of further assisting in the understanding of this invention it is described in connection with such distillation, with the understanding, however, that it is not limited thereto.

Other and further features and advantages of this invention will appear from the following description of an illustrative procedure embodying the practice of this invention, but it is to be understood that the invention is not limited to the particular apparatus, features of construction, materials treated and produced, temperatures, proportions or conditions mentioned. Moreover, it is obvious that various features of this invention can be advantageously employed separately or conjointly within the spirit of this invention.

In the drawing in which like reference characters indicate similar parts,

Fig. 1 is a diagrammatic view in vertical section of apparatus embodying my invention and whereby my process may be practiced.

Fig. 2 is a vertical sectional view of a detail, with parts broken away; and

Fig. 3 is a partial sectional view on line 3—3 of Fig. 2.

Referring to the drawing, the oil to be fractionated is subjected to vaporizing heating in heater 10 which may be of any suitable construction, and then introduced into rectifying tower 50 11 which may be of any suitable construction. In the construction illustrated, oil to be fractionated is supplied through pipe 12 under control of valve 13 and passes through coils 14 to which heat is supplied in any suitable manner 55 as by means of valve-controlled oil burner 15. Thus, the oil is heated to a temperature which, with a minimum of cracking, will cause a predetermined proportion of the oil passing to the tower to be in vapor phase after entering the 60 tower, and then the heated oil is introduced into vaporizing zone 16 of the tower.

For the purpose of making readily known the operation of the apparatus shown in the drawing, the fractionation of a topped residue, having a flash point of about 350° F., of Mid-continent crude petroleum, will be described, with the understanding that the invention is not limited to the treatment of such oil. In such case, the oil is heated to about 800° F. and the hot oil 70 and resulting vapors are introduced into vaporizing zone 16 where they are contacted with steam rising in the tower from below that zone as hereinafter described, and the resulting vapors rise in the column. It is desirable to free such vapors 75 of mechanically entrained particles of unvaporized asphalt and to this end the vapors may be caused to pass through any desired number of rows of baffles 17 of which two are shown in the drawing; and then the vapors are passed through any suitable number of groups of bubble trays and the liquid collected in each group of trays is used as reflux liquid or is withdrawn from the side of the tower, preferably after being subjected to the stripping action of steam, as hereafter described.

It is to be understood that the bubble trays indicated in the drawing may be of any desired type having any desired number of flues 19 each provided with a cap 20 or having equivalent construction. Each bubble tray other than the lowermost tray of each group of trays or section is provided with a liquid-tube 21 which extends downward through the tray into the liquid on the tray next below in order that the lower end of each liquid-tube will be sealed in the liquid on the next lower tray, thus ensuring that rising vapors will pass only through flues 19 and under caps 20. Liquid of a depth suitable to seal caps 20 and tubes 21 is maintained on each tray in any suitable manner as by extending tubes 21 for a sufficient distance above each of the trays through which they extend.

Successively arranged above baffles 17 are stripping section 22, fractionating section 23, stripping section 24 and fractionating section 25. Stripping sections 22 and 24 each comprise a transverse partition 26 having a central opening from which rises flue 27; and in the annular chamber so formed are any desired number of bubble trays 28 of which two are shown in the drawing. Stripping sections are for the removal of undesirably light constituents from distillates about to be withdrawn from the tower and steam is supplied to stripping sections 22 and 24, for example, steam at 800° F. through pipe 29 under the control of valves 30, and the desired distillates B and C are withdrawn respectively by pumps 131 and 132 from the bottom of stripping sections 22 and 24 respectively through pipes 31 and 32. A cup 33 or other suitable means may be employed to maintain sealing liquid above the lower end of liquid pipes 34 leading through the lowermost of trays 28 into the lowermost portion of each stripping section. Thus, liquid pipes 34 are maintained sealed at their lower ends even though liquid is so completely withdrawn through pipes 31 and 32 that those pipes might not otherwise be maintained in sealed condition.

Oil vapors not condensed within the tower and steam pass from the top thereof through pipe 35 to condenser 36 through which a cooling medium is circulated as by means of pipes 37 and the resulting liquid passes through pipe 38 to receiver 39. To receiver 29 is connected water pump 40 for the removal of condensed steam, vacuum pump 41 for maintaining a vacuum in the interior of the tower and oil pipe 42 leading from the receiver at such level as to carry off supernatant oil therein. Reflux tank 43 receives oil from pipe 42 and the lightest fraction produced from the original oil is removed from reflux tank 43 by means of pump 44 while reflux liquid is withdrawn therefrom by pump 45 and passed to pipe 46 into the top of tower 11.

Liquid condensed in fractionating section 25 and flowing to the lowermost tray thereof is divided into two parts, one of which flows into the stripping section 24 next below for final stripping and withdrawal from the side of the tower and the other of which passes as a reflux through pipe 47 to the uppermost tray of the next lower fractionating section 23. The constructional details whereby the liquid from the lowermost tray of fractionating section 25 is so divided is shown in Figs. 2 and 3. Liquid flows from the lowermost tray of fractionating section 25, through liquid pipe 48 of which the lower end is sealed in liquid in container 49. Container 49 is provided with a spout 50 through which liquid flows and across the edge of which dividing plate 51 is moveable by means of shaft 52 which is threaded into plate 51 and is rotatable from the exterior of the tower as by hand-wheel 53. Liquid passing through spout 50 on one side of dividing plate 51 is caught in trough 54 having a spout 55 which conducts the liquid into funnel 56 at the top of pipe 47. Liquid condensed in section 23 is passed from the lowermost tray thereof to stripping section 22 as by liquid pipe 230.

Immediately below vaporizing zone 16 are any desired number of bubble trays 58, of which two are shown in the drawing, and liquid collected on the lowermost of trays 58 is passed through pipe 59 to tray 60 from which it passes by pipe 61 to pump 62 and then through pipe 63 to reheater 64 which comprises coil 65 to which heat is supplied in any suitable manner as by valve-controlled oil burner 66. Pipe 59 extends above the lowermost of trays 58, a distance sufficient to maintain a depth of liquid thereon that will seal the bubble caps thereof, and the lower end of pipe 59 is surrounded by cup 33 which maintains the lower end thereof sealed even though all of the liquid is withdrawn from tray 60 by pump 62. Reheated oil from coil 65 passes through pipe 67 into auxiliary vaporizing zone 68 of the tower above which are located any desired number of rows of baffles 69 acting similarly to baffles 17, of which two are shown in the drawing and above the baffles are a stripping section 71 similar in construction to stripping sections 22 and 24, and a fractionating section 72. Liquid collecting on the lowermost tray of fractionating section 72 is all conducted by pipe 73 to stripping section 71. Distillate stripped in section 71 is withdrawn from the bottom thereof through pipe 74 by pump 174 as distillate A.

Below auxiliary vaporizing zone 68 is a fractionating or stripping zone 75 composed of any desired number of bubble trays of which two are shown. Liquid-tube 321 conducts liquid from the lowermost tray of section 75 to the bottom of the tower. A final asphaltic residue is withdrawn from the bottom of the tower through pipe 76 by pump 176. Steam is supplied to stripping section 71 from pipe 29 under control of valve 130 and steam is supplied to the bottom of the tower from pipe 29 under control of valve 77.

For the purpose of conducting into the tower at a point at or below vaporizing zone 16, and preferably into auxiliary vaporizing zone 68, heat additional to that supplied by steam or heater 10 or reheater 64, there is provided an auxiliary heater 78 having a coil 79 to which heat is applied in any suitable manner as by valve-controlled oil burner 80. The use of the heat supplied by burners 66 and 80 being optional that heat may be eliminated by closing the valve of either or both of said burners, the closing of the valve of burner 80 causing the reheating of the primary residue flowing in pipes 61 and 67 to be effected by heat supplied in heater 64 and the closing of the valve of burner 66 causing the reheating of the primary residue to be effected by heat supplied in heater 78 and delivered by oil in pipe 81 to zone 68 into which the primary residue is fed. A heating medium heated in heater 78 is conducted by pipe 81 to the interior of the tower at a point below vaporizing zone 16, preferably into auxiliary vaporizing zone 68 into which the primary residue is introduced through pipe 67. Heating medium is supplied by pipe 82 to heater 78, and may be derived from various sources, preferably being an oil which may be heated to a temperature equal to or in excess of that existing within the tower at the point at which it is introduced into the tower, without substantial harmful alteration due to that temperature. Thus, reflux liquid may be introduced into pipe 82 from pipe 83 under control of valve 84, or distillate C may be introduced into pipe 82 under control of valve 85. Either of said oils will vaporize within the tower and rise therein and be withdrawn therefrom at the same points at which they were respectively withdrawn originally; and any cracking of distillate C will render that distillate more readily dewaxable by pressing.

Reflux liquid is delivered to rectifying or condensing section 72 by pipe 86, to which any desired reflux liquid, including water, may be supplied under control of valve 87. Moreover, distillate B may be supplied to pipe 86 through cooler 90 under control of valve 88, or reflux liquid from tank 43 may be introduced into pipe 86 under control of valve 89, or distillate C may be introduced into pipe 86 through cooler 90 under control of valve 70, or distillate A may be introduced into pipe 86 through cooler 90 by pipe 91 under control of valve 92.

Referring more specifically to the fractionation of the oil referred to above as an example of oil which may be advantageously fractionated in accordance with this invention, namely, topped Mid-continent crude petroleum, a residue, obtained from such mixed-base petroleum and having a flash point of approximately 350° F., was heated in heater 10 to approximately 800° F. and introduced into vaporizing zone 16 which assumed a temperature of approximately 715° F. Steam at 800° F. and of which the liquid volume was approximately 15% of the liquid volume of the oil introduced into zone 16, was introduced at the bottom of the tower through valve 77. A primary residue comprising about 24% by volume of the original oil was withdrawn through pipe 61 and heated to about 800° F. and introduced into auxiliary vaporizing zone 68 which assumed a temperature of about 760° F. The bottom of the tower assumed a temperature of about 740° F. The temperature within flue 27 of stripping section 71 was about 750° F. The temperature immediately below trays 58 was about 700° F. The temperature within flue 27 of stripping section 22 was about 715° F.

The fractions produced were as follows:

The light fraction withdrawn from the reflux tank consisted of gas oil comprising 20% by volume of the original oil.

Distillate C was withdrawn at about 600° F. and constituted about 36% of the original oil and consisted of a light lubricating distillate containing wax which precipitated in crystalline form upon chilling, the said distillate having a viscosity of approximately 70 seconds Saybolt Universal at 100° F. and being sufficiently diluted with gas oil for dewaxing by chilling and pressing.

Distillate B was withdrawn at about 690° F. and constituted a heavy lubricating oil distillate comprising about 18% by volume of the original oil and having a flash point of 450° F. and a viscosity of about 80 seconds Saybolt Universal at 210° F.

Distillate A was withdrawn at about 740° F. and constituted a very heavy lubricating oil distillate comprising about 6% of the original oil and having a flash point of about 500° F. and a viscosity of about 120 seconds Saybolt Universal at 210° F., the reflux introduced through pipe 86 being gas oil.

The final residue was withdrawn at about 740° F. and comprised about 18% by volume of the original oil and consisted of asphalt substantially freed of lubricating oil.

Distillation loss was about 2% by volume of the original oil.

When using distillate B as the reflux introduced through pipe 86, after cooling that distillate by passing it through cooler 90, the distillate from pipe 74 constituted a mixture of the distillates A and B, above referred to, and its viscosity and flash points lay between the viscosities and flash points of distillates A and B above mentioned.

Regardless of the identity of the substance introduced as a reflux through pipe 86 the heat supplied to the tower and the cooling effect of that reflux were so co-ordinated that the vapors leaving section 72 and passing to vaporizing zone 16 were at a lower temperature than vaporizing zone 16 and therefore carried no oil which would condense into the primary residue and thereby become reheated more than once.

The foregoing exemplary procedure involves maintenance of a pressure within the tower of about 50 millimeters of mercury.

In the light of the foregoing disclosure, one skilled in the operation of rectifying towers used for the fractionation of oil will have no difficulty in so controlling the temperature therein at the various zones thereof, that the desired fractions will be produced. In this connection it may be noted that the dividing of the liquid flowing from the lowermost tray of section 25 determines the percentage of the original oil, which is withdrawn as distillate C and determines the reflux into section 23. The temperature of steam and the quantity thereof relative to that of the oil, in zone 16, will determine to some extent what proportion of the original oil will constitute the primary residue, and the volume of that residue taken in connection with the temperature obtained in reheater 64 will determine the amount of heat brought into zone 68 by reheating of the primary residue. The quantity of additional heat brought into zone 68 by oil flowing through pipe 81 will be determined by the quantity of oil passing through heater 78 and the temperature to which it is raised. By condensing from the steam which enters the bottom of the column and eventually passes into zone 16, oil vaporized from the asphaltic residue in zone 68, and by withdrawing the condensate from the tower below zone 16 and below the point at which the primary residue is withdrawn, reheated primary residue is not in any part subjected to a second reheating and the danger of cracking is minimized or eliminated.

While this invention has been described by reference to many specific details, it is understood that it is not limited to such details but includes such modifications and variations as fall within the accompanying claims. In this connection, it is to be noted that instead of using baffles 17, bubble trays may be employed which are supplied with reflux liquid from pipe 230 by means of a flow-dividing device similar to that which divides the flow from pipe 48 into parts which respectively go to stripping section 24 and to fractionating section 23. Similarly, bubble trays can be used instead of baffles 69, being supplied with liquid from pipe 73. Moreover, it is to be understood that while specific reference has been made to the use of steam supplied through valve 77 for the purpose of assisting in the stripping of the residue, it is to be understood that any suitable carrier vapor may be employed instead of or in conjunction with steam for that purpose, e. g., the vapor of any hydrocarbon that remains in vapor phase up to at least the level at which distillate B is withdrawn, and preferably a hydrocarbon that will pass from the top of the tower in vapor phase, may be used as carrier vapor. It is to be understood that purifying treatment for improving the color and stability of the oil produced (such as acid treatment or clay treatment either by the so-called clay filtering process or by the so-called clay contacting process, or both acid treatment and clay treatment) may be carried out in the production of low pour test lubricating oils, either before or after the dewaxing of the oil.

I claim:

1. In the distillation of petroleum oil, the steps comprising contacting carrier-vapor and oil at a temperature sufficiently high to effect partial vaporization of the oil, reducing the temperature of the resulting mixed vapors sufficiently to condense oil therefrom, then contacting the residual vapors with another body of oil separately heated to a temperature higher than that of said residual vapors, and distilling from said body a portion of the oil thereof.

2. In the distillation of petroleum oil, the steps comprising contacting carrier-vapor and oil at a temperature sufficiently high to effect partial vaporization of the oil, reducing the temperature of the resulting mixed vapors sufficiently to condense oil therefrom, then contacting the residual vapors with another body of oil separately heated to a temperature sufficiently high to effect partial vaporization of said last mentioned body of oil, thereby distilling from said body a portion of the oil thereof, and withdrawing said portion separately from said condensate.

3. In the distillation of petroleum oil, the steps comprising contacting carrier-vapor and oil at a temperature sufficiently high to effect partial vaporization of the oil, reducing the temperature of the resulting mixed vapors sufficiently to condense oil therefrom, withdrawing the resulting condensate from the residual vapors separately from the unvaporized residue of the oil contacted with carrier-vapor, and then contacting the residual vapors with another body of oil separately heated to a temperature sufficiently high to effect partial vaporization thereof.

4. In the distillation of petroleum oil, the steps comprising contacting carrier-vapor and oil at a temperature sufficiently high to effect partial vaporization of the oil, reducing the temperature of the resulting mixed vapors sufficiently to condense oil therefrom, withdrawing the resulting condensate from the residual vapors separately from the unvaporized residue of the oil contacted with carrier-vapor, then contacting the residual vapors with another body of oil separately heated to a temperature higher than that of said residual vapors.

5. In the distillation of petroleum oil, the steps comprising contacting carrier-vapor and a petroleum fraction having a relatively higher flash-point and separately heated to a temperature sufficiently high to effect partial vaporization thereof, reducing the temperature of the resulting mixed vapors sufficiently to condense oil therefrom, and then contacting the residual vapors with a petroleum fraction of relatively lower flash-point heated to a temperature sufficiently high to effect partial vaporization of said last mentioned fraction.

6. In the distillation of petroleum oil, the steps comprising contacting carrier-vapor and a petroleum fraction having a relatively higher flash-point and heated to a temperature sufficiently high to effect partial vaporization thereof, reducing the temperature of the resulting mixed vapors sufficiently to condense oil therefrom, withdrawing the condensate from the residual vapors separately from unvaporized oil, and then contacting the residual vapors with a petroleum fraction of relatively lower flash-point separately heated to a temperature sufficiently high to effect partial vaporization of said last mentioned fraction.

7. In the distillation of petroleum oil, the steps comprising contacting carrier-vapor and a petroleum fraction having a relatively higher flash-point and heated to a temperature sufficiently high to effect partial vaporization thereof, reducing the temperature of the resulting mixed vapors sufficiently to condense oil therefrom, and then contacting the residual vapors with a petroleum fraction of relatively lower flash-point heated to a temperature higher than the temperature of the residual vapors and sufficiently high to effect partial vaporization of said last mentioned fraction.

8. In the distillation of petroleum oil, the steps comprising contacting carrier-vapor and a petroleum fraction having a relatively higher flash-point and heated to a temperature sufficiently high to effect partial vaporization thereof, reducing the temperature of the resulting mixed vapors sufficiently to condense oil therefrom, withdrawing the condensate from the residual vapors separately from unvaporized oil, and then contacting the residual vapors with a petroleum fraction of relatively lower flash-point separately heated to a temperature sufficiently high to effect partial vaporization of said last mentioned fraction.

9. In the distillation of petroleum oil, the steps comprising contacting with carrier-vapor oil separately heated sufficiently to effect partial vaporization of the oil, out of contact with the vapors resulting from said first-mentioned contacting step, contacting the liquid residue of said first mentioned contacting step in a heated state with carrier-vapor, cooling the mixed vapors of said second mentioned contacting step sufficiently to condense oil therefrom, and utilizing the resulting vapors containing carrier-vapor in effecting the first mentioned contacting step.

10. In the distillation of petroleum oil, the steps comprising subjecting the oil to distillation and thereby forming a residue and a distillate, subjecting said residue out of contact with the vapors resulting from said last-mentioned distillation to distillation with carrier-vapor, condensing oil from the mixed vapors of said second distillation by cooling said vapors to a temperature below that of said first mentioned distillation, and contacting the residual vapors with the oil in said first distillation.

11. In the distillation of petroleum oil, the steps comprising subjecting the oil to distillation with fire and carrier-vapor and thereby forming a distillate and a residue, out of contact with the vapors resulting from said last-mentioned distillation, subjecting the residue to distillation with fire and carrier-vapor, cooling the mixed vapors of said second distillation to a temperature below that at which carrier-vapor is contacted with the oil in said first distillation and thereby condensing oil from said vapors, and then passing the residual vapors containing carrier-vapor from said cooling step into contact with the oil in said first distillation.

12. In the distillation of petroleum oil, the steps comprising subjecting the oil to distillation with fire and carrier-vapor and thereby forming a distillate and a residue, out of contact with the vapors resulting from said last-mentioned distillation, subjecting the residue to distillation with fire and carrier-vapor, cooling the mixed vapors of said second distillation to a temperature below that at which carrier-vapor is contacted with the oil in said first distillation and thereby condensing oil from said vapors, separately withdrawing the resulting residue and condensate from the resulting vapors, and then passing the residual vaports containing carrier-vapor from said cooling step into contact with the oil in said first distillation.

13. In the distillation of petroleum oil, the steps comprising subjecting the oil separately to vaporizing heating and to contact with carrier-vapor, by fractional condensation with reflux forming from the resulting mixed vapors and liquid a distillate and a primary residue, out of contact with said vapors subjecting the primary residue to vaporizing reheating and to contact with carrier-vapor, with reflux forming from the vapors and liquid resulting from said treatment of said primary residue a distillate and a final residue, and passing residual vapors including carrier-vapor into contact with oil which has been subjected to said vaporizing heating.

14. In the distillation of petroleum oil, the steps comprising subjecting the oil to vaporizing heating and to contact with carrier-vapor, forming from the resulting mixed vapors and liquid a distillate and a primary residue, out of contact with said vapors, subjecting said primary residue in a heated state to contact with carrier-vapor, and by contacting the resulting vapors with reflux forming from the vapors and liquid resulting from said treatment of said primary residue a distillate and a final residue and uncondensed vapors including said last-mentioned carrier-vapor.

15. The process according to claim 14 in which the reflux consists of the first mentioned distillate of said claim 14.

16. The process according to claim 14 in which a plurality of distillates is formed from the vapors first mentioned in said claim and the reflux mentioned in said claim consists of one of said distillates.

17. The process according to claim 14 in which a plurality of distillates is formed from the mixed vapors first mentioned in said claim and the reflux mentioned in said claim consists of the highest boiling of said distillates.

18. In the distillation of petroleum oil, the steps comprising subjecting the oil to vaporizing heating and to contact with carrier-vapor, forming from the resulting mixed vapors and liquid a distillate and a primary residue, out of contact with said vapors subjecting said primary residue in a heated state to contact with carrier-vapor and vaporizing oil from said primary residue and leaving a final residue, by contacting the vapors resulting from said second-mentioned contacting step with said distillate condensing oil from said last-mentioned vapors, and collecting the resulting condensate separately from said final residue.

19. In the distillation of petroleum oil, the steps comprising subjecting the oil to vaporizing heating and to contact with carrier-vapor, forming from the resulting mixed vapors and liquid a distillate and a primary residue, out of contact with said vapors subjecting said primary residue in a heated state to contact with carrier-vapor and vaporizing oil from said primary residue and leaving a final residue, by contacting the vapors resulting from said second-mentioned contacting step with said distillate condensing oil from said last-mentioned vapors, and separately from said final residue collecting together the resulting condensate and said distillate.

20. The process according to claim 14 in which the distillate first mentioned in said claim is formed by fractional condensation with reflux from the mixed vapors first mentioned in said claim and the reflux mentioned in said claim consists of said distillate.

21. The process according to claim 14 in which the vapors remaining after the formation of the second distillate mentioned therein contain carrier-vapor and are utilized in effecting the first contact with carrier-vapor mentioned in said claim.

22. The process according to claim 14 in which the vapors remaining after the formation of the second distillate mentioned therein contain carrier-vapor and are at a temperature not in excess of the temperature existing in the first contact mentioned in said claim and are utilized in effecting that contact.

23. In the distillation of petroleum oil the steps comprising, continuously subjecting the oil to vaporizing heating, then by contact with carrier-vapor and with reflux forming from the resulting mixed vapors and liquid by fractional condensation in a rectifying column a plurality of distillates withdrawn from the column at different levels thereof and a primary residue, continuously subjecting the primary residue to vaporizing reheating, and by contact with carrier-vapor and with reflux forming in the same column a distillate and a final residue from the vapors and liquid resulting from said reheating.

24. In the distillation of petroleum oil the steps comprising, continuously subjecting the oil to vaporizing heating, by contact with carrier-vapor and with reflux forming from the resulting mixed vapors and liquid by fractional condensation in a rectifying column a plurality of distillates withdrawn from the column at different levels thereof and a primary residue, out of contact with said vapors, continuously subjecting the primary residue to vaporizing reheating, and by contact with carrier-vapor and with reflux forming in the same column a distillate and a final residue from the vapors and liquid resulting from said reheating, the vapors remaining after said last mentioned contacting step being introduced to said first mentioned contacting step.

25. In the distillation of petroleum oil the steps comprising, continuously subjecting the oil to vaporizing heating, by contact with carrier-vapor and with reflux forming from the resulting vapors and liquid by fractional condensation in a rectifying column a plurality of distillates withdrawn from the column at different levels thereof and a primary residue, continuously subjecting the primary residue to vaporizing reheating, and by contact with carrier-vapor and with reflux forming in the same column a distillate and a final residue from the vapors and liquid resulting from said reheating, said last mentioned reflux consisting of one of said first mentioned distillates.

26. In the distillation of petroleum oil, the steps comprising continuously subjecting the oil to vaporizing heating and introducing the resulting vapors and liquid into a rectifying column at an intermediate level thereof, by fractional condensation with reflux forming from the resulting vapors distillates of different boiling ranges and a primary residue, reheating the primary residue of the oil introduced to the tower and within the tower at a lower level thereof, subjecting it to contact with carrier-vapor, and with reflux condensing a distillate from the resulting vapors of said primary residue at a level below said first mentioned level.

27. In the distillation of petroleum oil, the steps comprising contacting carrier-vapor and oil at a temperature sufficiently high to effect partial vaporization of the oil, reducing the temperature of the resulting mixed vapors sufficiently to condense oil therefrom, then contacting the residual vapors with another body of oil not previously contacted by said carrier-vapor and heated to a temperature higher than that of said residual vapors, and distilling from said body a portion of the oil thereof.

28. In the distillation of petroleum oil, the steps comprising subjecting the oil to vaporizing heating and to contact with carrier-vapor, by fractional condensation with reflux forming from the resulting mixed vapors and liquid a distillate and a primary residue, out of contact with said vapors, subjecting the primary residue to vaporizing reheating and to contact with carrier-vapor, with reflux forming from the vapors and liquid resulting from said treatment of said primary residue a distillate and a final residue, and passing residual vapors including carrier-vapor into contact with oil which has been subjected to said vaporizing heating.

29. In the distillation of petroleum oil, the steps comprising contacting with carrier-vapor oil heated sufficiently to effect partial vaporization of the oil and leaving a residue of the oil, out of contact with the vapors resulting from said vaporization, contacting said residue of said first-mentioned contacting step in a heated state with carrier-vapor, cooling the mixed vapors of said second-mentioned contacting step to a temperature below that of the residue of the first-mentioned vaporizing step and thereby condensing oil from said mixed vapors, and utilizing the vapors resulting from said cooling step and containing carrier-vapor in effecting the first-mentioned contacting step.

30. In the distillation of petroleum oil, the steps comprising contacting with carrier-vapor oil heated sufficiently to effect partial vaporization of the oil and leaving a primary residue of the oil, out of contact with the resulting vapors contacting said primary residue with carrier-vapor and with a heated heat-carrying medium and vaporizing oil from said primary residue, cooling the mixed vapors of said second-mentioned contacting step sufficiently to condense therefrom oil vaporized from said primary residue by said second-mentioned contacting step, and utilizing the vapors resulting from said cooling step and containing carrier-vapor in effecting the first-mentioned contacting step.

31. In the distillation of petroleum oil, the steps comprising subjecting the oil to vaporizing heating and to contact with carrier-vapor, by fractional condensation with reflux forming from the resulting mixed vapors and liquid a distillate and a primary residue, out of contact with the resulting vapors subjecting the primary residue to contact simultaneously with carrier-vapor and with said distillate in a heated state and vaporizing oil from said primary residue, cooling the mixed vapors of said second-mentioned contacting step sufficiently to condense therefrom oil vaporized from said primary residue, and utilizing the vapors resulting from said cooling step and containing carrier-vapor in effecting the first-mentioned contacting step.

32. In the distillation of petroleum oil, the steps comprising continuously subjecting the oil to vaporizing heating and introducing the resulting vapors and liquid into a rectifying column at an intermediate level thereof, by fractional condensation with reflux forming from the resulting vapors a distillate and a primary residue, at a lower level within the column contacting said primary residue with said distillate in a heated state and with carrier-vapor and vaporizing oil from said primary residue, and with reflux condensing a distillate at a level between said first and second-mentioned levels from the vapors rising from said primary residue in said last-mentioned contacting step.

33. In the distillation of petroleum oil, the steps comprising continuously subjecting the oil to vaporizing heating and introducing the resulting vapors and liquid into a rectifying column at an intermediate level thereof, by fractional condensation with reflux forming from the resulting vapors a distillate and a primary residue, at a lower level within the column contacting said primary residue with said distillate in a heated state and with carrier-vapor and vaporizing oil from said primary residue, with reflux condensing a distillate at a level between said first and second-mentioned levels from the vapors rising from said primary residue in said last-mentioned contacting step, and passing upwardly in said column the vapors remaining after said last-mentioned condensing step.

LEO D. JONES.